Jan. 17, 1956  J. KAMLET  2,731,329
PROCESS FOR OXIDIZING NITROSYL CHLORIDE
Filed Sept. 20, 1952
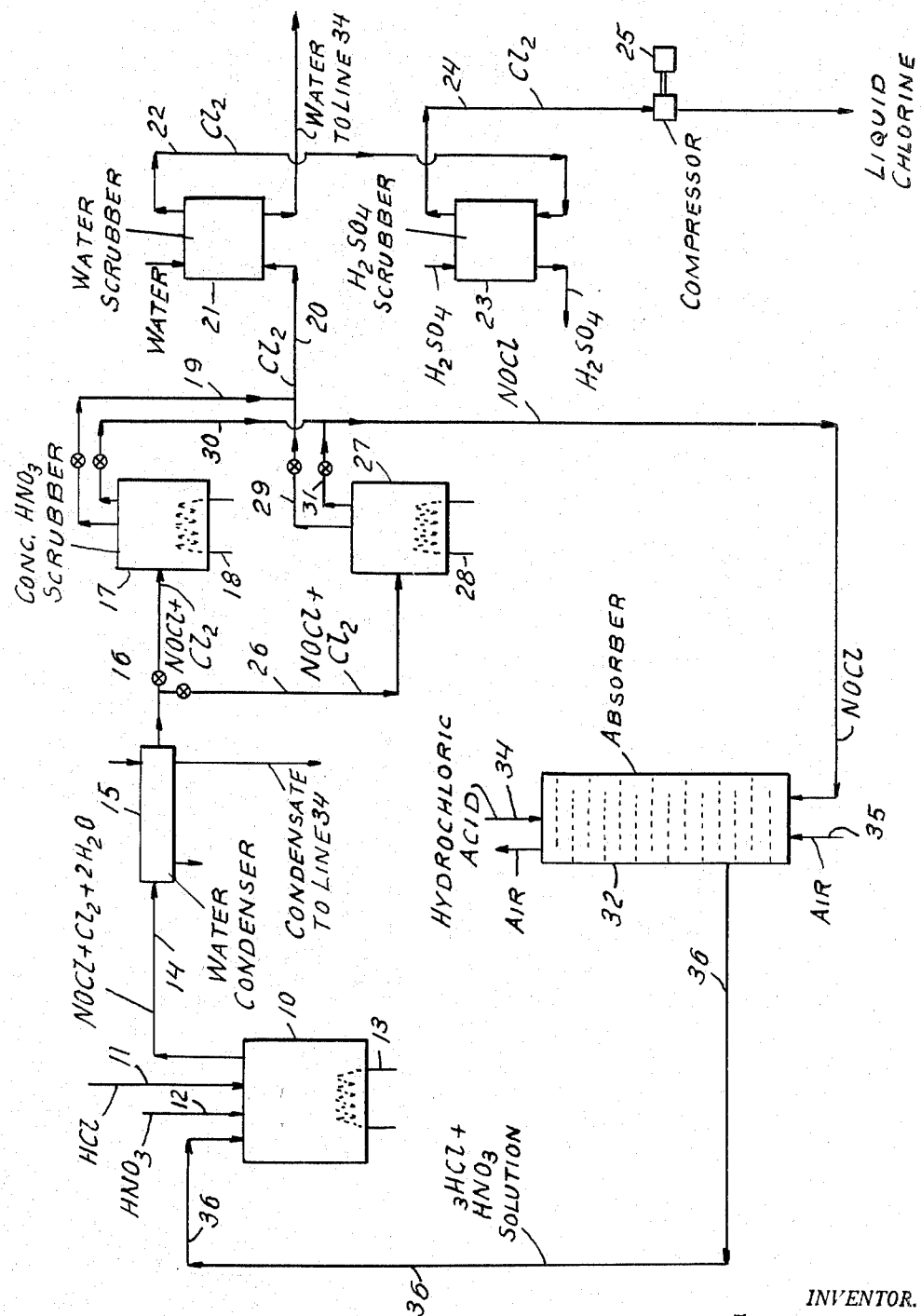
INVENTOR.
JONAS KAMLET
BY
Adams Forward & McLean
ATTORNEYS

United States Patent Office 2,731,329
Patented Jan. 17, 1956

2,731,329

PROCESS FOR OXIDIZING NITROSYL CHLORIDE

Jonas Kamlet, Easton, Conn., assignor, by mesne assignments, to The Kamlet Laboratory, New York, N. Y., a partnership Application September 20, 1952, Serial No. 310,590

1 Claim. (Cl. 23—219)

My invention relates to a process for the production of high strength chlorine by oxidation of hydrochloric acid. More particularly, it relates to an improved process in which nitrosyl chloride, obtained for example by oxidizing hydrochloric acid with nitric acid to produce chlorine and nitrosyl chloride, is oxidized with air in the presence of hydrochloric acid to produce a mixture of concentrated hydrochloric and nitric acids, which may be further reacted to produce chlorine and additional nitrosyl chloride.

Numerous processes have been proposed for the catalyzed oxidation of hydrogen chloride gas or hydrochloric acid solutions to chlorine, but such processes which use oxygen or air as the oxidizing agent suffer from various disadvantages. For example, in the former case, those processes which use oxygen as the oxidizing agent require the installation of a plant for the manufacture of pure oxygen, an expense which makes the entire conversion process economically unattractive, and those processes which use air as the oxidizing agent yield chlorine containing gas mixtures having only from about 2 per cent to a maximum of 20 per cent chlorine content. These low chlorine content gas mixtures may be used locally but are entirely unsuited for compression and liquefaction for shipment to distant consuming areas.

Other processes have been proposed for the manufacture of chlorine from hydrochloric acid based on the reaction of hydrochloric acid with nitric acid to form chlorine and nitrosyl chloride:

$$3HCl + HNO_3 \rightarrow Cl_2 + NOCl + 2H_2O$$

These require separation of the chlorine and nitrosyl chloride and, if the yield of chlorine recovered based on the hydrochloric acid charged is to be above about 67 volume per cent, require further processing of the nitrosyl chloride for the recovery of chemical values therefrom. Processes which have been proposed for the recovery of chlorine values from nitrosyl chloride are complicated and ordinarily not commercially justified by the small increase in chlorine yield. For example, nitrosyl chloride reacts with oxygen in the gas phase very slowly at temperatures below 200° C. to form chlorine and nitrogen dioxide and even more slowly when the oxygen is in the form of air.

My invention provides a process whereby hydrochloric acid, even in comparatively dilute solutions, may be oxidized to chlorine substantially free of nitrogen and other inert gases which is suitable for compression and liquefaction even though air rather than oxygen is used as the oxidizing agent. The chlorine gas product is suitable for any of the uses to which chlorine is normally applied, including such processes as yield hydrogen chloride gas as a by-product, e. g. the chlorination of organic compounds. I have found that nitrosyl chloride may be readily oxidized with excess air in the presence of a dilute aqueous hydrochloric acid solution at normal or moderate temperatures to produce a mixture of concentrated hydrochloric and nitric acids in a relatively simple and inexpensive operation according to the equation:

$$2NOCl + 2H_2O + O_2 \xrightarrow{(HCl)} 2HCl + 2HNO_3$$

Thus the by-product nitrosyl chloride formed in a hydrochloric acid-nitric acid reaction to produce chlorine may be converted into the starting materials for the original reaction and a cyclic process is made possible in which the yields of chlorine from feed-stock hydrochloric acid are nearly quantitative and in which the chlorine product is of 95 per cent or better purity.

According to my invention, nitrosyl chloride together with excess oxygen in the form of air is intimately contacted with a dilute aqueous hydrochloric acid solution at temperatures of about 0° to 50° C., preferably 20 to 30° C., to produce a mixture of concentrated hydrochloric and nitric acids. The dilute hydrochloric acid solution may be of 5 per cent to 40 per cent hydrogen chloride concentration (3.2° to 24° Baumé) but advantageously is of 20 per cent to 25 per cent (12.9° to 16° Baumé) concentration. The constant boiling 20.24 per cent hydrochloric acid solution boiling at 110° C., i. e., the strongest hydrochloric acid solution obtainable by simple distillation and fractionation of more dilute hydrochloric acid solutions, is preferred. The excess air is at least 2.5 volumes and preferably 5 volumes of air per volume of nitrosyl chloride or at least 0.25 part and preferably 0.50 part of oxygen per part of nitrosyl chloride. The dilute hydrochloric acid and the nitrosyl chloride-air mixture are preferably contacted in such a manner that the hydrochloric acid is enriched relative to the feed and the gaseous mixture is depleted in concentration of nitrogen and chlorine values so as to provide an acid mixture containing concentrated hydrochloric and nitric acids in the molar ratio of about 3 to 1. Advantageously the hydrochloric acid and the nitrosyl chloride-air mixture are contacted in counter-current flow in a tower or series of towers containing bubble plates or packing material.

My invention finds particular utility when incorporated in a process for the production of high-strength chlorine by oxidation of hydrochloric acid. For example, concentrated hydrochloric acid and concentrated nitric acid are reacted at elevated temperatures to produce a gas mixture containing chlorine and nitrosyl chloride. The gas mixture is passed through nitric acid of 50 per cent to 100 per cent concentration (34° to 49° Baumé) at a temperature of 15° to 35° C. which dissolves or liquefies the nitrosyl chloride and permits the chlorine to pass through. The nitrosyl chloride is recovered and together with excess air is contacted with hydrochloric acid of 5 per cent to 40 per cent concentration at a temperature between about 0° to 50° C., advantageously between about 20° and 30° C., to form a mixture of concentrated hydrochloric and nitric acids. This mixture is then recycled as charge stock to the process.

The process of my invention is more fully illustrated by reference to the accompanying drawing. In the drawing, hydrochloric acid and nitric acid in a molar ratio of 3:1 respectively are charged to reaction vessel 10 by means of lines 11 and 12 and raised to elevated temperature by means of heating coil 13. The gaseous reaction products containing nitrosyl chloride and chlorine are passed through line 14 to water condenser 15 in order to remove entrained moisture. The dehydrated gaseous mixture is passed through valved line 16 to nitric acid absorber 17 equipped with heating unit 18. The nitric acid in absorber 17 dissolves the nitrosyl chloride from the gas mixture and chlorine is removed through lines 19 and 20 to water scrubber 21. In the scrubber the water decomposes traces of residual nitrosyl chloride into NO, NO₂ and HCl. The scrubbed chlorine is then passed by line 22 to a sulfuric acid scrubber 23, which serves the double purpose of absorbing traces of $NO_2$ and NO which come through with the chlorine and of drying the chlorine gas. The dried, nitrogen oxide-free chlorine is passed by means of line 24 to compressor 25 and then condensed and liquefied.

When the nitric acid in absorber 17 has become saturated with nitrosyl chloride, the flow of the gaseous mixture is switched from line 16 to valved line 26 and the nitrosyl chloride and chlorine containing gas is passed to another nitric acid filled absorber 27, containing heating unit 28, arranged in parallel with absorber 17. The chlorine is removed from absorber 27 through lines 29 and 29. The nitric acid in absorber 17 is then stripped of its nitrosyl chloride content by heating to 60° to 70° C. by means of heating element 18. The nitrosyl chloride evolved passes through line 30 to absorber 32 and the nitric acid in absorber 17 is thereby regenerated. After the nitric acid in absorber 17 is cooled to about 20° to 30° C., the absorber is ready for reuse. When the nitric acid in absorber 27 becomes saturated with nitrosyl chloride, operation may be switched back to absorber 17 and the dissolved nitrosyl chloride evolved from the nitric acid in absorber 27, heated by means of element 28, is withdrawn through line 31 and passed to absorber 32 by line 30. Dilute hydrochloric acid is supplied to absorber 32 through line 34 and excess air is supplied by means of line 35. The temperature of the absorbing hydrochloric acid solution in absorber 32 is maintained at 20° to 30° C., for example, by cooling water circulating over the outside wall of absorber 32. A mixture of concentrated hydrochloric acid and nitric acid is removed from absorber 32 by means of line 36 and recycled to reaction vessel 10 as charge stock.

The following example illustrates the reagents, proportions, and other conditions which are typical of a process to produce high-strength chlorine in which my invention is utilized.

*Example I*

A solution containing 111 parts of hydrogen chloride (3 moles), 63 parts of nitric acid (1 mole) and 216 parts of water was placed in a glass-lined (e. g. Pyrex) vessel and heated to a temperature of 85° to 95° C. The gas mixture evolved was passed through an efficient condenser to condense as much of the water as possible and return it to the heated solution. The partially dried mixture of nitrosyl chloride and chlorine was passed through a solution of nitric acid containing 1000 parts of 69 per cent nitric acid (42° Baumé) maintained by cooling at a temperature between 20° and 30° C. The nitrosyl chloride (66 parts) dissolved in the concentrated nitric acid whereas the chlorine passed through unchanged. The chlorine evolved was washed first through water and then through sulfuric acid.

When the concentrated nitric acid had become saturated with nitrosyl chloride, the stream of nitrosyl chloride and chlorine was passed to another nitric acid filled absorber and the nitric acid in the first absorber was stripped of its nitrosyl chloride content by heating to 60° to 70° C. by means of steam coils placed in the absorber. The nitrosyl chloride thus evolved (66 parts) was mixed with 16.5 to 33 parts of oxygen in the form of air and the mixture passed counter-currently through a series of packed towers where it was contacted with 308 parts of 25 per cent hydrochloric acid (15.4° Baumé). The effluent solution obtained from the last tower consisted of a solution of 111 parts of hydrogen chloride (3 moles), 63 parts of nitric acid (1 mole) and 216 parts of water.

The equipment used in the process must of course be acid resistant. Pyrex-glass lined equipment is preferred, with glass-sealed connections at points where the temperature exceeds 50° C. and vinyl chloride resin connections where temperatures below 50° C. are encountered. Various types of nickel alloys or Iconel equipment may also be used.

I claim:

A cyclic process for the oxidation of hydrochloric acid to high-strength chlorine which comprises reacting hydrochloric acid with nitric acid at elevated temperature to produce a gaseous mixture of nitrosyl chloride and chlorine, separating nitrosyl chloride and chlorine by dissolving the nitrosyl chloride from the gaseous mixture in concentrated nitric acid, recovering the chlorine, stripping the nitrosyl chloride from its nitric acid solution, oxidizing the nitrosyl chloride with excess air in the presence of an aqueous hydrochloric acid solution of about 5 per cent to about 40 per cent hydrogen chloride concentration at a temperature between about 0° and 50° C. to produce a mixture of concentrated hydrochloric and nitric acids, and recycling the acid mixture as charge stock.

References Cited in the file of this patent

UNITED STATES PATENTS

| | | |
|---|---|---|
| 1,899,123 | Uebler | Feb. 28, 1933 |
| 2,150,669 | Beekhuis | Mar. 14, 1939 |
| 2,211,531 | Beekhuis | Aug. 13, 1940 |
| 2,240,668 | Reed | May 6, 1941 |
| 2,261,329 | Beekhuis | Nov. 4, 1941 |
| 2,297,281 | Beekhuis | Sept. 29, 1942 |
| 2,320,257 | Beekhuis | May 25, 1943 |